US011201915B1

(12) United States Patent
Mesard et al.

(10) Patent No.: US 11,201,915 B1
(45) Date of Patent: Dec. 14, 2021

(54) PROVIDING VIRTUAL SERVER IDENTITY TO NODES IN A MULTITENANT SERVERLESS EXECUTION SERVICE

(71) Applicant: Amazon Technologies, Inc., Seattle, WA (US)

(72) Inventors: Wayne Mesard, Belmont, MA (US); Evgenia Mikhailovna Nitishinskaya, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 16/457,539

(22) Filed: Jun. 28, 2019

(51) Int. Cl.
*H04L 29/08* (2006.01)
*H04L 29/12* (2006.01)

(52) U.S. Cl.
CPC ...... *H04L 67/1031* (2013.01); *H04L 61/1511* (2013.01); *H04L 61/1541* (2013.01); *H04L 67/06* (2013.01); *H04L 67/1008* (2013.01); *H04L 67/327* (2013.01)

(58) Field of Classification Search
CPC . H04L 67/1031; H04L 67/06; H04L 61/1541; H04L 67/1008; H04L 67/327; H04L 61/1511
See application file for complete search history.

(56) References Cited

U.S. PATENT DOCUMENTS

| | | | |
|---|---|---|---|
| 5,854,901 A | 12/1998 | Cole et al. | |
| 7,240,060 B2 | 7/2007 | Adya et al. | |
| 8,311,043 B2 | 11/2012 | Goryavsky | |
| 9,232,002 B1 * | 1/2016 | Sorenson, III | H04L 67/1034 |
| 2013/0142201 A1 * | 6/2013 | Kim | H04L 12/4645 370/392 |
| 2015/0309831 A1 * | 10/2015 | Powers | G06F 11/1438 718/1 |
| 2018/0020246 A1 * | 1/2018 | Harrison | H04L 65/4069 |
| 2018/0063233 A1 * | 3/2018 | Park | H04L 67/1008 |
| 2018/0241809 A1 * | 8/2018 | Gandhi | H04L 67/1002 |
| 2019/0014171 A1 * | 1/2019 | Stein | G06F 9/542 |
| 2019/0236683 A1 * | 8/2019 | Anand | G06F 16/00 |
| 2020/0092271 A1 * | 3/2020 | Kumar | H04L 63/101 |
| 2020/0195520 A1 * | 6/2020 | Guim Bernat | H04L 41/5054 |
| 2020/0389516 A1 * | 12/2020 | Parekh | G06F 9/44505 |

* cited by examiner

*Primary Examiner* — Shean Tokuta
*Assistant Examiner* — Juan C Turriate Gastulo
(74) *Attorney, Agent, or Firm* — Robert C. Kowert; Kowert, Hood, Munyon, Rankin & Goetzel, P.C.

(57) ABSTRACT

Computer systems and methods are disclosed to implement a virtual server using a multitenant serverless execution service (MTSES) and a request labeling endpoint outside the MTSES to identify the virtual server to worker nodes in the service. The MTSES is configured to host multiple virtual servers, and forward requests for the different virtual servers to dynamically selected worker nodes. However, in embodiments, the MTSES is not configured to determine the virtual server targeted by the requests. Accordingly, to allow the MTSES to support virtual servers that require knowledge of their identity, for example to authorize incoming requests, a request labeling endpoint is provided outside the MTSES to forward requests to the MTSES and automatically label individual requests with an endpoint identifier associated with their target virtual servers. In this manner, nodes in the MTSES can dynamically determine the virtual server that they are to assume for each request.

20 Claims, 11 Drawing Sheets

*Performed by a request labeling endpoint for a virtual server implemented using a multitenant serverless execution service (MTSES)*
710

Receive a request directed to the virtual server
720

Label the request with an endpoint identifier associated with the virtual server
730

Forward the request to the MTSES
740

*Performed by the MTSES, which does not provide identity information about hosted virtual servers to its worker nodes*
750

Receive requests directed to different virtual servers hosted by the MTSES
760

Dynamically select nodes from a pool of nodes to execute individual requests
770

During execution of an individual request by a selected node, determine the endpoint identifier for the virtual server from the labeled request
780

FIG. 7

Receive a client request to create a virtual server using a multitenant serverless execution service (MTSES), where the MTSES dynamically selects nodes to execute requests for different virtual servers but does not provide identity information of respective target virtual servers of the requests to the nodes selected to execute the requests
810

Execute the creation request according to the client request
820

Provision a request labeling endpoint for the virtual server, where the request labeling endpoint is implemented outside the MTSES and configured to label requests directed to the virtual server with an endpoint identifier associated with the virtual server and send the requests to the MTSES
830

Initiate the virtual server in the MTSES, so that nodes selected to execute the requests for the virtual server are configured to determine the endpoint identifier of the virtual server during the execution of the requests
840

Assign a Domain Name System (DNS) name to the virtual server in accordance with the client request
850

FIG. 8

PROVIDING VIRTUAL SERVER IDENTITY TO NODES IN A MULTITENANT SERVERLESS EXECUTION SERVICE

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). As the scale and scope of distributed systems have increased, the tasks of provisioning, administering, and managing the resources have become increasingly complicated. A distributed system referred to as a service provider network may offer, to various customers, access to computing resources and services implemented using the distributed system. When customers access such resources remotely, the resources may be said to reside "in the cloud" and may represent cloud computing resources. Using such cloud computing resources, the service provider network may execute programs on behalf of customers on computing hardware in the service provider network.

Some types of applications or services to be hosted in a cloud-based service provider network may be associated with fluctuating or unpredictable demand. For example, certain applications may experience brief spikes of high demand, followed by long periods of little or no demand. It is generally wasteful to dedicate full time hardware resources to these types of applications or services, since any devoted resources will remain idle most of the time. However, if these applications and services are provisioned with too few resources, they may be easily overwhelmed during peak demand periods. Better execution systems are generally needed to support these types of applications and services in cloud-based environments in a more flexible manner, to reduce the high costs of dedicated hardware resources.

BRIEF DESCRIPTION OF THE DRAWINGS

FIG. 7 is a flow diagram illustrating a process of handling a request by a virtual server implemented using a request labeling endpoint and a MTSES, according to some embodiments.

FIG. 8 is a flow diagram illustrating a process of performing a request to create a virtual server using a request labeling endpoint and a MTSES, according to some embodiments.

Figure 1:
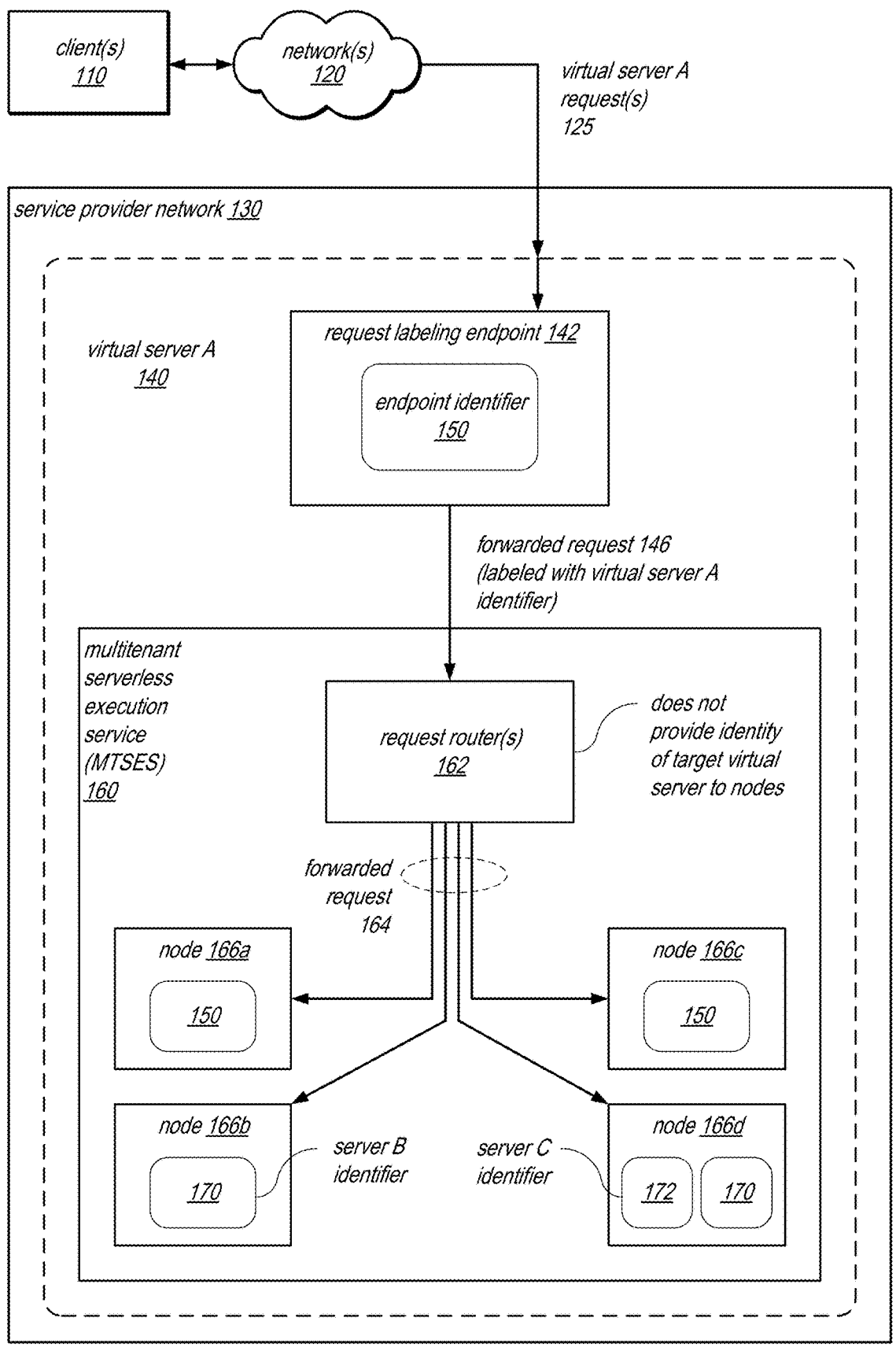
FIG. 1 is a block diagram illustrating a virtual server that is implemented using a multitenant serverless execution service (MTSES) and a request labeling endpoint that labels requests forwarded to the MTSES, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Systems and methods are disclosed herein to describe embodiments of a virtual server implemented on a multitenant serverless execution service (MTSES) and with a request labeling endpoint to serve as a request endpoint for the virtual server and label requests forwarded to the MTSES with a server or endpoint ID associated with the virtual server.

In some situations, a cloud-based service provider network may wish to implement an application or a service in a serverless manner, that is, without statically assigning hardware resources (e.g. computing or storage resources) to the application or service. As discussed, dedicating hardware resources to certain applications may be wasteful, because some applications or services may exhibit "bursty" or highly fluctuating demand over time. To reduce the costs of hosting such applications or services, in some embodiments, the applications or services may be implemented using a serverless execution model, where hardware resources are not dedicated around-the-clock to the particular application or service. In some embodiments, the hardware resources may be selected or provisioned for the application or service on demand, as requests are received for the application or service. In some embodiments, a serverless execution service may be used to perform this selection or provisioning of resources very quickly, so that clients of the application or service do not experience any significant latency for their individual requests.

Embodiments of a virtual server disclosed herein may be built using such a serverless execution service or incorporate such a serverless execution service. In some embodiments, the serverless execution service allows the virtual server to be maintained in a cloud-based service provider network with no or little dedicated hardware. In some embodiments, serverless execution service may dynamically assign worker nodes from a worker node pool to assume the virtual server for one or more requests directed to the virtual server. In some embodiments, the worker nodes may be implemented using virtual machines that are hosted on physical hosts in the service provider network.

It is noted that the serverless "virtual servers" in this context are distinct from "virtual machines" such as VMware virtual machines, Docker containers, etc. The latter "virtual machines" or VMs are specific machine instances running on a single specific physical host, while the former "virtual server" is an emulated server hosted on a fleet of physical hosts or worker nodes within the serverless execution service. At any given time, the "virtual server" may be running on a subset of dynamically selected hosts or nodes in the fleet, or on no host or node at all when there are no pending requests for the virtual server. In some embodiments, the serverless execution service may be a multitenant service that is configured to host a number of different virtual servers (possibly for different clients of the service provider network) on top of the fleet of physical hosts or worker nodes. In some embodiments, each physical host or worker node in the multitenant serverless execution service ("MTSES") may implement a separate multitenant environment, where at any given time the physical host or worker node may be assuming or "impersonating" multiple different virtual servers. In some embodiments, multiple hosts or nodes may be used in the MTSES to impersonate a single virtual server (e.g. by maintaining individual live connections to the virtual server). In some embodiments, this serverless arrangement allows the virtual server to be hosted with very little hardware resources. For example, in some embodiments, an idle virtual server in the MTSES may consume little or no computing resources.

In some embodiments, the MTSES is designed to be "serverless," so that it is not implemented to determine the particular virtual server that is the target of individual incoming requests. For example, in some embodiments, the MTSES may not provide a high-level request interface (e.g., an HTTP-based on web services interface) to allow an endpoint or server ID to be specified along with an incoming request. In some embodiments, the MTSES does not provide a mechanism to determine which virtual server is the target of an incoming request, and cannot determine which virtual server to assume for the incoming request.

Moreover, in some embodiments, execution of requests by the worker nodes may require the nodes to have knowledge of the virtual server's identity. For example, a virtual Secure Shell (SSH) File Transfer Protocol (SFTP) server may be hosted in a serverless environment. In this example, a worker node that is being asked to assume the SFTP server needs to know the server's identity in order to authenticate the user associated with the request. However, in some embodiments, the MTSES may be implemented in a manner where it cannot provide the server identity associated with the request to the worker node. For example, in some embodiments, in forwarding the request internally to the worker node, the MTSES may rewrite the request packets' IP addresses or otherwise fail to preserve any identifying information of the virtual server indicated by the original request. Without the server identity of the target virtual server of the request, the worker node cannot know which virtual server to assume to properly carry out the request.

Accordingly, in some embodiments, a request labeling endpoint is created for the virtual server outside of the serverless execution service or MTSES to provide a server or endpoint ID for the virtual server. In some embodiments, the request labeling endpoint may be used to represent a particular virtual server hosted in the MTSES to clients, and maintain or generate a server or endpoint ID for the virtual server. The request labeling node may be configured to inject the endpoint ID to traffic forwarded to the MTSES, in a manner to ensure that the endpoint ID is provided to the worker nodes in the MTSES. In some embodiments, the request labeling endpoint may act as a request endpoint for the virtual server to receive all requests for the virtual server. In some embodiments, the request labeling endpoint is configured to label received requests with a server indicator or identifier for the virtual server, and then forward the labeled requests to the MTSES. In some embodiments, this labeling may be performed in a manner so that the endpoint ID will be delivered to the worker nodes of the MTSES despite any network address rewrites performed by the MTSES. In some embodiments, the labeling may be accomplished without changing the internal routing or networking protocol of the MTSES. Accordingly, the worker nodes of the MTSES can obtain the virtual server's ID from the labeled request and use the endpoint ID to obtain any other server-specific context information needed to handle the request. In this manner, the virtual server may be fully decoupled from any actual physical machine or network interface, so that the virtual server can be permitted to float from worker node to worker node in the MTSES.

In some embodiments, the request labeling endpoint may be implemented using a network load balancer (NLB) node, which may be a physical device or a virtualized device. In some embodiments, the NLB node may be implemented in a fleet of NLB nodes, which may be maintained by the service provider network. In some embodiments, the NLB may extract the destination IP address of an incoming request as the endpoint ID, and inject the endpoint ID into a request stream destined for the MTSES. In some embodiments, the incoming request may be associated with a connection (e.g. a Transmission Control Protocol or TCP connection) to the virtual server. In some embodiments, the injection may occur during a connection establishment process between the request labeling endpoint and the MTSES. By labeling the TCP connection with the endpoint ID (e.g. using an initial message or packet sent via the connection or an attribute transmitted during the connection establishment process), all subsequent messages in the connection are effectively labeled with the endpoint ID.

Depending on the embodiment, the request labeling endpoint may be implemented using different types of computing resources. For example, in some embodiments, the request labeling endpoint may be implemented on a request router, a network gateway, or a network router. In some embodiments, the request labeling endpoint may be implemented as a private service endpoint that may be established in the service provider network. In some embodiments, the service provider network may allow customers or clients to create private service endpoints to point to a particular service hosted in the service provider network. In some embodiments, a private service endpoint may be created as a network element in a particular "virtual private cloud" network or "VPC" created for a client on the service provider network, and only be accessible from within the VPC. In some embodiments, a private service endpoint may be configured to point to the MTSES, and label requests to be forwarded with a VPC identifier for the VPC where the private service endpoint resides. In some embodiments, the private service endpoint may label requests with an endpoint identifier associated with the private service endpoint.

As may be understood by those skilled in the art, the embodiments of the systems and methods disclosed herein may be used to implement a variety of virtual servers or services of different types over a serverless execution service. As discussed, one type of virtual server that may be implemented in this manner is a SFTP server. As another example, a virtual Simple Mail Transfer Protocol (SMTP) server may be implemented in the described manner, using a request labeling endpoint point and a MTSES. As yet another example, a request labeling endpoint may be used to represent a virtual Simple Network Management Protocol (SNMP) server hosted in the MTSES.

As may be understood by those skilled in the art, the disclosed approach to implementing virtual servers provides a number of technical advantages over conventional systems that aim to provide similar functionality. In one respect, the disclosed request labeling endpoint technique is not deeply dependent on the specific architecture of the serverless execution service, and can be applied to many different types of serverless execution systems to implement different types of virtual servers. Advantageously, use of an external request labeling endpoint does not impact the internal workings of the serverless execution service, and avoids the need of having to modify the internal routing protocols of serverless execution service, which may be difficult or impossible. In another respect, the request labeling endpoint may be implemented as a light weight component, which may be cheaply created and maintained, and implemented in a variety of ways. For example, depending on the embodiment, the request labeling endpoint may be implemented as a standalone node for an individual virtual server, or piggybacked on existing nodes such as a request router node or load balancer node. In yet another respect, in some embodiments, the request labeling endpoint can be configured to label entire connections or request sessions, so as to allow the serverless execution service to distribute individual connections or sessions across the fleet of worker nodes, allowing the serverless execution service to emulate connection-oriented servers in a highly scalable manner. These and other features and benefits of the disclosed virtual server implementation are discussed in further detail below, in connection with the figures.

FIG. 1 is a block diagram illustrating a virtual server that is implemented using a multitenant serverless execution service (MTSES) and a request labeling endpoint that labels requests forwarded to the MTSES, according to some embodiments.

As shown, the figure depicts a cloud-based service provider network 130 that can be accessed over one or more networks 120 by various clients 110. In some embodiments, the network 120 may be a public network such as the Internet. In some embodiments, the client(s) 110 may lease different amounts of computing resources for one or more services provided by the service provider network 130, such as a service to provide client-defined virtual servers (e.g. virtual server A 140). In some embodiments, the service provider network may provide a variety of different types of computing-related services, which are implemented using hardware provided by the service provider network 130. As another example, in some embodiments, the multitenant serverless execution service (MTSES) 160 may be a service provided directly to clients. In some embodiments, the MTSES 160 may be a generalized serverless execution service, which may execute a variety of client-defined functions, in response to trigger conditions defined by the clients. In some embodiments, the service provider network 130 may operate a large number of computing resource instances that may be provisioned and de-provisioned on demand to support the operations of its services.

In various embodiments, the components in the services may be implemented directly within computer hardware, as instructions directly or indirectly executable by computer hardware (e.g., a microprocessor or computer system), or using a combination of these techniques. For example, the components of the serverless execution service 160 may be implemented by a distributed system including a number of computing nodes. In some embodiments, the functionality of a given service system component may be implemented by a particular computing node or may be distributed across several computing nodes. In some embodiments, a given computing node may implement the functionality of more than one service system component.

The client(s) 110 of the service provider network 130 may encompass any type of client configurable to submit service requests to a provider network. In some embodiments, a client 110 may include a suitable version of a web browser or a plug-in module for a web browser, or other type of code module configured to execute as an extension to or within an execution environment to provide database or data storage service clients (e.g., client applications, users, and/or subscribers) access to the services provided by provider network. Alternatively, a client 110 may encompass an application such as a database application, media application, office application or any other application that may make use of persistent storage resources.

As shown, in the depicted embodiment, a virtual server A is hosted in the service provider network. In some embodiments, the virtual server A may be provided by a virtual server management or hosting service, which may be used by clients 110 to create and maintain various types of virtual servers. In some embodiments, the virtual servers may be a specific type of server, such as an SFTP server. In some embodiments, as shown, the virtual server A 140 may be hosted so that it will be able to receive requests 125 directed to it, and provide responses as virtual server A.

As shown, virtual server A 140 may be implemented in the service provider network by a request labeling endpoint 142 and a MTSES 160. In some embodiments, the request labeling endpoint 142 may receive requests 125 directed to virtual server A 140, and forward the requests 146 to the MTSES 160. In some embodiments, the endpoint 142 may be provided specifically for the virtual server A 140. In some embodiments, the endpoint 142 may be shared by a number of different virtual servers. In some embodiments, when the virtual server A is created in the service provider network, the service provider network may provide the identity or network address of the endpoint 142 as virtual server A's identity or network address. Accordingly, clients 110 can subsequently direct all virtual server A requests 125 to that server identity or network address.

As shown, in some embodiments, the virtual server A is implemented using a MTSES 160. In some embodiments, the MTSES 16 may management a pool of worker nodes, such as nodes 166a-d, which may be dynamically selected or in some embodiments provisioned in response to incoming server requests. Thus, in some embodiments, a hosted virtual server in the MTSES is not permanently or statically associated with any particular worker node. Rather, worker nodes are dynamically selected on a per-request basis, to assume the virtual server to handle individual requests. In some embodiments, a node may be asked to assume the virtual server for an entire connection session (e.g. a connection request), to handle all requests to the given virtual server for that particular connection.

In some embodiments, as shown, the MTSES 160 may be a multitenant service, which may be hosting many different virtual servers at the same time. In this example, two other virtual servers B and C are also hosted in the MTSES 160. In some embodiments, the individual nodes 166 of the MTSES 160 may also be themselves multitenant environments. Thus, an individual worker node (e.g. node 166d) may be assuming or "impersonating" multiple different virtual servers at the same time. In some embodiments, the MTSES 160 may select or use different nodes at the same time to impersonate a single virtual server.

As shown, in some embodiments, the MTSES 160 may not be designed or configured to provide information about the identity of the target virtual server to the nodes. In some embodiments, the MTSES may not support a mechanism to recognize different virtual servers that are targeted by individual incoming requests. Because the MTSES is a "serverless" system, in some embodiments, the MTSES does not implement a request forwarding system that is aware of multiple hosted virtual servers with distinct server or endpoint IDs.

As depicted, incoming server requests to the MTSES 162 may first be received by a request router 162. In various embodiments, the request router 162 may comprise a fleet of request router nodes, or a request routing infrastructure, which may include multiple layers of request routers. Such a request routing infrastructure may implement functionality such as load balancing, request filtering or throttling, various types of request transformation or network address translation, etc., among other types of functions. In some embodiments, the request router 162 does not preserve or provide the identity of the virtual server targeted by individual requests to the individual selected worker nodes.

As discussed, in some embodiments, when a server is hosted as a virtual server in the MTSES 160, the worker nodes 166 need to know the identity of the virtual server that they are being asked to assume for individual requests. In some embodiments, the endpoint ID may be needed to determine if an incoming request (e.g. associated with a particular user) is authorized (e.g. whether the user is allowed to interact with the particular server, and what actions the user is allowed to perform on the server). In some embodiments, the endpoint ID may be needed by the worker node for other reasons (e.g. to determine what data it is allowed to access).

However, as discussed, in some embodiments, the MTSES 160 is designed or configured so that it (e.g. the request router 162) does not provide the server identity information of the targeted virtual server to the worker nodes. For example, in some embodiments, the MTSES 160 does not support a mechanism to recognize different virtual servers based on incoming requests. Because the MTSES is a "serverless" system, in some embodiments, the MTSES 160 and the request router 162 may not be implemented to distinguish individual incoming requests based on their targeted virtual server.

Moreover, in some embodiments, the request forwarding protocol of the MTSES 160 may not deliver a server or endpoint identifier received with an incoming request. For example, in some embodiments, the hosted virtual server (e.g. virtual server A 140) may present a service interface that is defined using a network protocol (e.g. a set of defined network messages). In some embodiments, the identity of the targeted server may be provided as part of the underlying network protocol (e.g. the destination IP address of incoming IP packets). However, in some embodiments, the MTSES request router 162 may not preserve this server identity information when the requests are ultimately provided to the worker nodes, leaving the worker nodes no way of determining what virtual server it is being asked to assume. As one example, one type of such a virtual server may be virtual SFPT server, whose service interface is defined as a network protocol. As discussed, in some embodiments, the MTSES 160 does not guarantee to preserve the virtual server's destination IP address by the time server requests are forwarded to the worker nodes 166.

Accordingly, in some embodiments, the request labeling endpoint 142 is used to provide some type of server identifier, indicator, or endpoint identifier or indicator (e.g. endpoint identifier 150) for the virtual server, and provide this identifier or indicator to worker nodes to identify the virtual server being targeted by individual requests. In some embodiments, the request labeling endpoint 142 may label individual incoming requests (or a group or stream of incoming requests) with the target virtual server's identity. In some embodiments, the endpoint identifier 150 for virtual server A may be a server ID that is uniquely tied to virtual server A. In some embodiments, the endpoint identifier 150 may be one of several endpoint identifiers that can be used to resolve to virtual server A, which may have a uniquely assigned internal server ID. In some embodiments, the actual value of the endpoint identifier 150 may be changed over time. In some embodiments, an endpoint identifier 150 may be reused or reassigned to different virtual servers over time. The labeled requests are then forwarded to the MTSES 160.

In some embodiments, the labeling may be performed in a way so that they will be delivered to the worker nodes 166 in the MTSES. In some embodiments, the labeling is done in a way that does not require a modification to the network protocol or request forwarding protocol used by the MTSES 160. In this manner, the worker nodes can use these labels to obtain the identity of the virtual server that they are asked to assume. For example, as shown in the figure, two nodes (nodes 166a and 166c) are selected to act as virtual server A for different requests, and both nodes are able to obtain the identifier 150 associated with virtual server A during execution of their respective requests. As shown, the MTSES (e.g. the request router 162) may forward request 164 for many different virtual servers to different selected worker nodes. In some embodiments, these forwarded requests 164 may come from different instances of request labeling endpoints (similar to endpoint 142), which may label the requests with identifiers for other hosted virtual servers. As shown, in this example, other nodes are able to obtain the identifiers of these other virtual servers. As shown, node 166b is able to obtain an identifier 170 for a virtual server B, and node 166d is able to obtain the virtual server B identifier 170, and also another server or endpoint identifier 172 for a virtual server C. In some embodiments, the worker nodes 166a and 166c may then perform a lookup in a service database using the received endpoint ID 150, to obtain an internal server ID of virtual server A that is used by the MTSES 160.

In some embodiments, instead of the request labeling endpoint 142 maintaining the server or endpoint identity for each separate connection, this information may be maintained by the individual worker nodes in the MTSES. For example, in some embodiments, the endpoint 142 may simply provide the server or endpoint identifier 150 to the worker nodes at the beginning of each internal connection (e.g. TCP connection). In some embodiments, the endpoint ID 150 may be provided as an initial message or packet in an established internal connection. In some embodiments, the endpoint ID 150 may be provided during the connection establishment process (e.g. during the TCP establishment handshake). For example, in some embodiments, the endpoint ID 150 is added as metadata to a first SYN packet sent by the endpoint 142 to the MTSES 160. In some embodiments, this metadata will be passed by the MTSES 160 to the selected worker node for the connection request. In some embodiments, the worker node will use this metadata (the endpoint ID) to determine whether to accept the connection request. If the connection is accepted, the worker node will use the endpoint ID as the identifier for the virtual server for all subsequent request traffic received through the connection. In some embodiments, the connection may always be established without use of the endpoint ID, but may then be subsequently dropped based on the initial packet (indicating the endpoint ID) received over the connection.

It should be noted that while the process here is discussed mostly using the TCP connection protocol, these techniques could also be applied to other protocols such as the User Datagram Protocol (UDP). In the case of UDP, for example, the metadata or endpoint ID may be prepended to every single UCP datagram. Accordingly, the request labeling endpoint 142 can also be used to label requests for virtual servers that do not employ TCP connections. In some embodiments, the request labeling endpoint may be configured with a variety of labeling modes, so that it can be used to label requests for a variety of different types of virtual servers.

Figure 2:
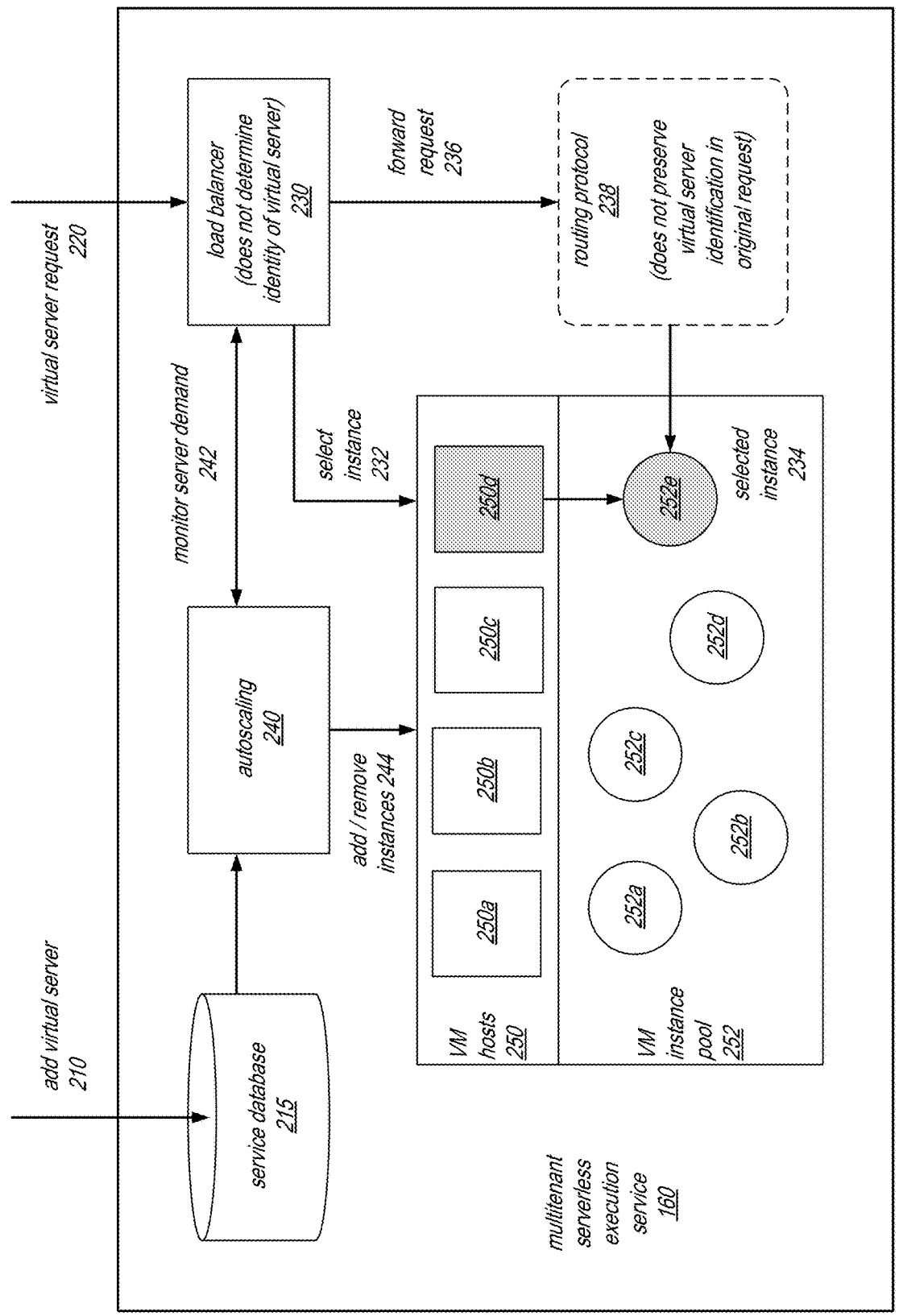
FIG. 2 is a block diagram illustrating an example implementation of a serverless execution service that uses virtual machines to handle virtual server requests, according to some embodiments.

FIG. 2 is a block diagram illustrating an example implementation of a serverless execution service that uses virtual machines to handle virtual server requests, according to some embodiments. As shown, the illustrated serverless execution service may be an embodiment of the MTSES 160 of FIG. 1.

As shown, in some embodiments, the MTSES 160 may be configured to receive requests 210 to add virtual servers. For example, the MTSES 160 may be used to implement public server on a service provider network, to allow clients or customers to define different instances of virtual servers to be hosted in the MTSES 160. As shown, in some embodiments, new virtual servers may be added to s service database 215 of the MTSES 160. In some embodiments, the service database 215 may store customer data for the service, for example, the configuration data associated with the different virtual servers hosted. For example, such server-specific configuration data may indicate different users recognized by each virtual server, the users' various permissions on the server, the different stores of data on the service provider network that the server is permitted to access, among other metadata.

As shown, in some embodiments, the MTSES 160 may receive virtual server requests 220, in this example, requests 220 to a particular virtual server (e.g. virtual server A 140). In some embodiments, the request 220 may be received by a load balancer 230 of the MTSES 160. Depending on the embodiment, the load balancer 230 may be implemented as part of the request router 162, or separate from the request router 162. As shown, the load balancer 230 may not be aware of the virtual servers that are being hosted in the MTSES 230. In some embodiments, because the MTSES 160 is designed as a "serverless" system, the request forwarding infrastructure of the service are not implemented to recognize distinct endpoint IDs associated with incoming requests 220.

In some embodiments, the load balancer may provide a load balancing function, for example, to distribute requests among the worker nodes of the MTSES so as to even out the workload of the nodes. For example, in some embodiments, the load balancer 230 may maintain a count of a number of open connections or requests forwarded to each node, and implement a policy to even out the count for all available nodes. In some embodiments, the load balancer may query the nodes (or possibly obtain from a monitoring subsystem) other types of load metrics for the nodes, and use these load metrics to perform the load balancing. As the result of the load balancer's load balancing decision, a node may be selected 232 to handle the incoming request 220. In this example, the selected instance or node 234 is a node 252e executing on VM host 250d.

In some embodiments, the serverless execution service 160 may automatically manage the provisioning of compute nodes in the service. In some embodiments, as shown, the worker nodes may be virtual machine instances 252a-c and 110 that execute on virtualization hosts 250) to perform virtual server requests. In some embodiments, the serverless execution service may maintain a pool 252 of VM instances to perform these requests, but the instances or nodes in the pool are not dedicated or statically provided to any particular virtual server. Rather, they are selected only to perform a particular incoming request, and released back to the pool after the request is executed. In this manner, the MTSES 160 may be used to implement an execution service that is capable of hosting or emulating a large number of different virtual servers.

In some embodiments, as shown, once an instance or node is selected 232, the request 220 may be forwarded to the selected node (here VM instance 252e executing on VM host 250d). However, as shown, in some embodiments, the routing protocol 238 of the MTSES 160 may not preserve any identification information of the intended virtual server specified in the original request that was received by the request labeling endpoint. For example, in some embodiments, the original request may specify the network address of the virtual server that is to perform the request. As discussed, in some embodiments, the MTSES's routing protocol may overwrite the destination network address of the virtual server, in some cases multiple times on transit to the worker node fleet, so that by the time the request reaches the worker node 252e, the request no longer contains the original destination network address. In some embodiments, the ultimate request provided to the worker node 252e may reflect a source IP address corresponding to a regional load balancer (e.g. load balancer 230), and a destination IP address corresponding to the selected instance 252e. Accordingly, as discussed in connection with FIG. 1, an external request labeling endpoint (e.g. endpoint 142) may be used to provide a server or endpoint ID for the virtual server, and inject the endpoint ID into the forwarded request stream or label requests with the endpoint ID, so that the worker node 252e can use that endpoint ID (e.g. virtual server network address) determine which virtual server it is to emulate. In some embodiments, the worker node may use the virtual server's network address to look up an internal server ID from the service database 215, for example, using a lookup table maintained in the service database 215. In some embodiments, the lookup table may be modified as new virtual servers are added to or removed from the SFTP service 330, to associated different endpoint identifiers with different internal server identifiers.

As shown, in some embodiments, the MTSES 160 may implement an autoscaling module 240. In some embodiments, the autoscaling module 240 automatically scale the size of the fleet or pool 252 of the VM instances or nodes to handle incoming virtual server requests. In some embodiments, the autoscaling module 240 may be configured to create, based on the configuration data in the service database 215, additional instances or nodes in the VM instance or node pool 252. In some embodiments, the autoscaling module 240 may be configured to monitor 242 demand for all hosted virtual servers or particular virtual servers (for example by periodically collecting data from the load balancer 230), and use this information to control the size of the VM instance pool 252 or worker node pool. In some embodiments, the autoscaling module 240 may be able to dynamically add or remove instances 244 from the pool, so as to keep the pool at an appropriate size based on currently observed demand for the MTSES 160 or a particular hosted virtual server. In some embodiments, a particular node for a particular virtual server may be retained in the pool 252 for a period of time after the node has finished performing a request or disconnected from a client connection, so that subsequent requests or connection to that virtual server can quickly reuse that node. In some embodiments, the MTSES 160 may maintain a small set of nodes for a "high priority" virtual server even when there are no recent requests for that virtual server. Accordingly, when a new request does arrive, one of the nodes in the set can be immediately used to service the request, without incurring significant node startup costs for that virtual server.

Figure 3:
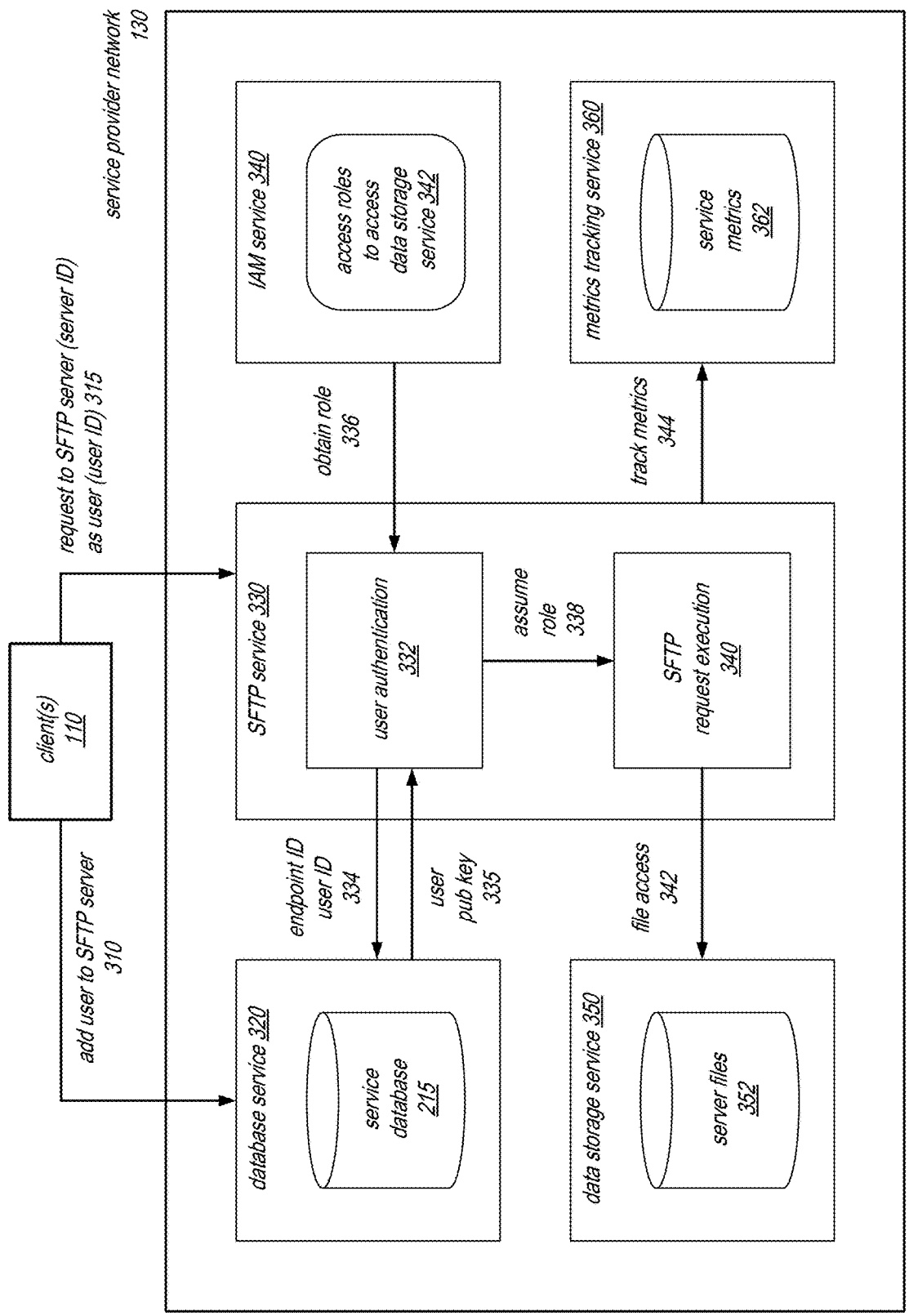
FIG. 3 illustrates an example Secure Shell File Transfer Protocol (SFTP) service in a cloud-based service provider network, according to some embodiments.

FIG. 3 illustrates an example Secure Shell File Transfer Protocol (SFTP) service in a cloud-based service provider network, according to some embodiments.

As shown, in some embodiments, the service provider network 130 may be used to implement a SFTP service 330 as one of its provided services. In some embodiments, the SFTP service 330 may be used to create and host many client-defined SFTP servers. As discussed, in some embodiments, these client-defined SFTP servers may be hosted in the SFTP service 330 as virtual servers (e.g. virtual server A 140 of FIG. 1). Thus, in some embodiments, the illustrated SFTP service 330 may be implemented using one or more request labeling endpoints 142, which may be dynamically provisioned or assigned to different customer SFTP servers, and a MTSES 160 that uses a fleet of worker nodes to emulate the different customer SFTP servers.

As shown, in some embodiments, the service provider network 130 may implement a database 320, which may be used to host different database instances in the cloud, using hardware resources provided by the service provider network. In some embodiments, the service database 215 of FIG. 2 may be implemented in the database service 320. As shown, in some embodiments, client requests to create a new SFTP server, or requests 310 to add a user to the SFTP server, may be forwarded to the database service 320 to update the configuration data in the service database 215.

As shown, subsequently, a server request 315 may made to the SFTP service 330. In some embodiments, the server request 315 may specify the particular virtual server to be used (via a server or endpoint ID) and a user associated with the request (via a user ID). For example, in some embodiments, the request 315 may comprise a login request by a user to login to a particular SFTP server hosted by the service 330.

In some embodiments, when the SFTP service 330 receives the server request 315, the service may perform an authentication of the user via a user authentication module 332. In some embodiments, the user authentication module and the SFTP request execution module 340 may be implemented on individual worker nodes of the MTSES 160. As may be understood, in order to perform the user authentication and possible other operations in the SFTP request execution module 340, the worker node needs to determine the endpoint ID of the SFTP server. Accordingly, in some embodiments, the request labeling endpoint 142 may be employed in the SFTP service 330 to label incoming requests with the endpoint ID, so that it can be retrieved by the worker nodes in order to performed user authentication.

As shown, in some embodiments, the user authentication module 332 may submit both the endpoint ID and the user ID to the database service 320, to look up a public key 335 for the user, which may be used to encrypt or decrypt data during SFTP request execution. In some embodiments, traffic over a SFTP connection conducted over a secure channel such as a Secure Shell (SSH) channel. In some embodiments, SSH uses public-key cryptography to authenticate a remote computer and allow the remote computer to authenticate the user, if necessary. In some embodiments, the user's public key 335 may be deposited by the client 110 when the user is added, and the key 335 maybe used to authenticate the user when server request 315 is received at the SFTP service 330. Depending on the embodiment, different types of authentication schemes or methods may also be used. However, in the various types of authentication schemes, the worker node (or the user authentication module 332) will still need to obtain the endpoint ID of the virtual SFTP server, which may be provided by the request labeling endpoint 142 of FIG. 1, as discussed.

As shown, in some embodiments, if the user is authenticated, the SFTP service 330 may send a request to an identity and management service 340 of the service provider network 130, to obtain a role to execute the SFTP request (or a subsequent SFTP request received via the SFTP connection). In some embodiments, the IAM service 340 may store credentials and roles (e.g. access roles 324) with their assigned permissions. Such permissions may include, for example, permission to access different data stores in a data storage service 350 implemented by the service provider network. In some embodiments, the various services of the service provider network may enforce permissions by checking the permissions for the various credentials and roles stored in the IAM service 340. In some embodiments, instead of configuring the data storage service 350 with different client-specific credentials, the SFTP service 330 may generate and rely on internally generated roles to access different data stores (e.g. server-specific "buckets") in the data storage service 350. In some embodiments, the obtained role 336 may represent a role for a particular SFTP server that is associated with the request 315. When the access role is obtained, the SFTP service 330 (e.g. a particular worker node) may assume that role 338, in order to perform the requested action.

As shown, in some embodiments, the requested action may be performed by a SFTP request execution module 340, which may be implemented by a worker node of the MTSES 160. In some embodiments, the worker node may run an individual process to emulate the SFTP server, and perform one or more requested actions (e.g. file accesses 342) by generating requests to the data storage service 350 implemented in the service provider network. In some embodiments, the data storage service 350 may maintain respective data stores for individual virtual SFTP servers hosted in the service 330. In some embodiments, the file access operations 342 may include any type of FTP operations, such as create or delete files, modify files, or transfer files, etc. In some embodiments, the file data associated with individual virtual servers may be stored in repositories for server files 352, maintained by the data storage service 350.

As shown, in some embodiments, the service provider network 130 may implement a metrics tracking service 360. In some embodiments, the metrics tracking service 360 may be used by the service provider network to track a variety of metrics that can be produced from the network's various services. As shown, in this example, the SFTP service 330 may generate some metrics that may be tracked 344 by the metrics tracking service 360. In some embodiments, such metrics may include service-specific metrics such as number of server connections, amount of data stored, amount of data transferred, etc. In some embodiments, these metrics may be stored in a services metrics database 362, which may be hosted in the database service 320. In some embodiments, these captured metrics may be used to make a number of programmatic decisions in the service provider network control plane, or be provided to customers or administrators in various metrics reports.

Figure 4A:
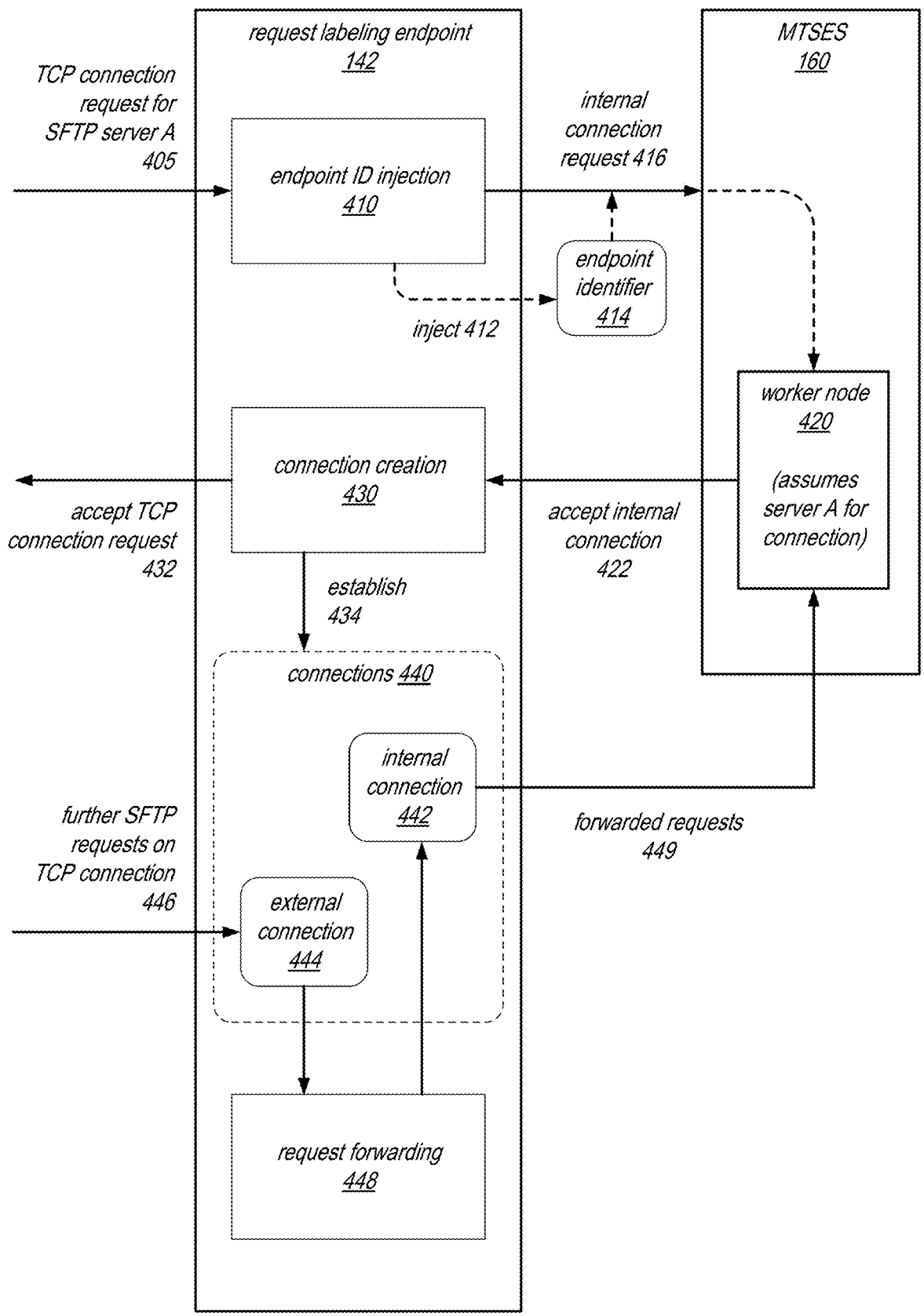
FIG. 4A illustrates an example request labeling endpoint used to implement an SFTP service on top of a MTSES, according to some embodiments.

FIG. 4A illustrates an example request labeling endpoint used to implement an SFTP service on top of a MTSES, according to some embodiments. As shown, the figure depicts a series of interactions between an embodiment of the request labeling endpoint 142 and an embodiment of the MTSES 160.

As shown, at operation 405, a request for a TCP connection to SFTP server A is received at the request labelling endpoint 142. The SFTP server A may be, for example, the virtual server A 140 of FIG. 1. In some embodiments, the request labeling endpoint 142 may be implemented in a SFTP service such as service 330 of FIG. 3.

As shown, the request 405 may in some embodiments be handled by a server or endpoint ID injection module 410. As shown, the injection module may inject 412 an identifier for server A 414 into another request 416 for an internal connection to the MTSES. In some embodiments, the server A ID 414 may be the destination IP address specified in the connection request 405, which may be the external IP address assigned to server A. In some embodiments, the internal connection request 416 may request to establish a direct connection (e.g. a TCP connection) with a worker node (e.g. node 420) in the MTSES 160. In some embodiments, the internal connection request 416 may be directed to some other node or component that may act as an endpoint for such connections.

As shown, in this example, a worker 420 is selected to receive the internal connection request 416, and assumes server A for that connection. As shown, the worker node 420 sends a message 422 to accept the internal connection. In some embodiments, the accept message 422 may be an acknowledge message sent according to the TCP handshake procedure. As discussed, in some embodiments, in order to decide to accept the internal connection and assume server A for the connection, the worker node 420 may need to determine certain server context information for server A. As discussed, the worker node may use the endpoint ID 414 to determine this server context information.

As shown, when the endpoint 142 receives the message 422 accepting the internal request, it may invoke a connection creation module 430 to create a pair of connections 440. The first is the internal connection 442 to the worker node 420. The second is an external connection 444 to the client that sent the connection request 405. In some embodiments, the external connection 444 may also be a TCP connection, which is established using a similar handshake procedure as for the internal connection 442.

As shown, in this example, further SFTP requests on the TCP connection 446 may be sent from the client to the request labeling endpoint 142. As discussed, in some embodiments, the endpoint 142 may act as an endpoint for the virtual server A for all incoming requests. In some embodiments, a request forwarding module 448 may be used to forward all incoming traffic from the external connection 444 unto the internal connection 442, which may be forwarded 449 to the worker node 420 at the other end of the internal connection. In some embodiments, no additional labeling may be performed on this traffic, because the worker node 142 may be configured to assume that all traffic received on the internal connection 442 are associated with server A, whose ID was received by the worker node when the internal connection was first established. In some embodiments, for example, where the internal communication is forwarded to the worker node in a connectionless protocol such as UDP, each datagram may be labeled with the endpoint ID 414. In some embodiments, not shown in the figure, the request labeling endpoint 142 may also act as a proxy node for egress traffic, so that any server responses provided by the worker node are forwarded by the endpoint 142 through the external connection 444 to the client. In some embodiments, when the SFTP connection is terminated, either by the client or the worker node, the endpoint 142 may remove the connections 440.

Figure 4B:
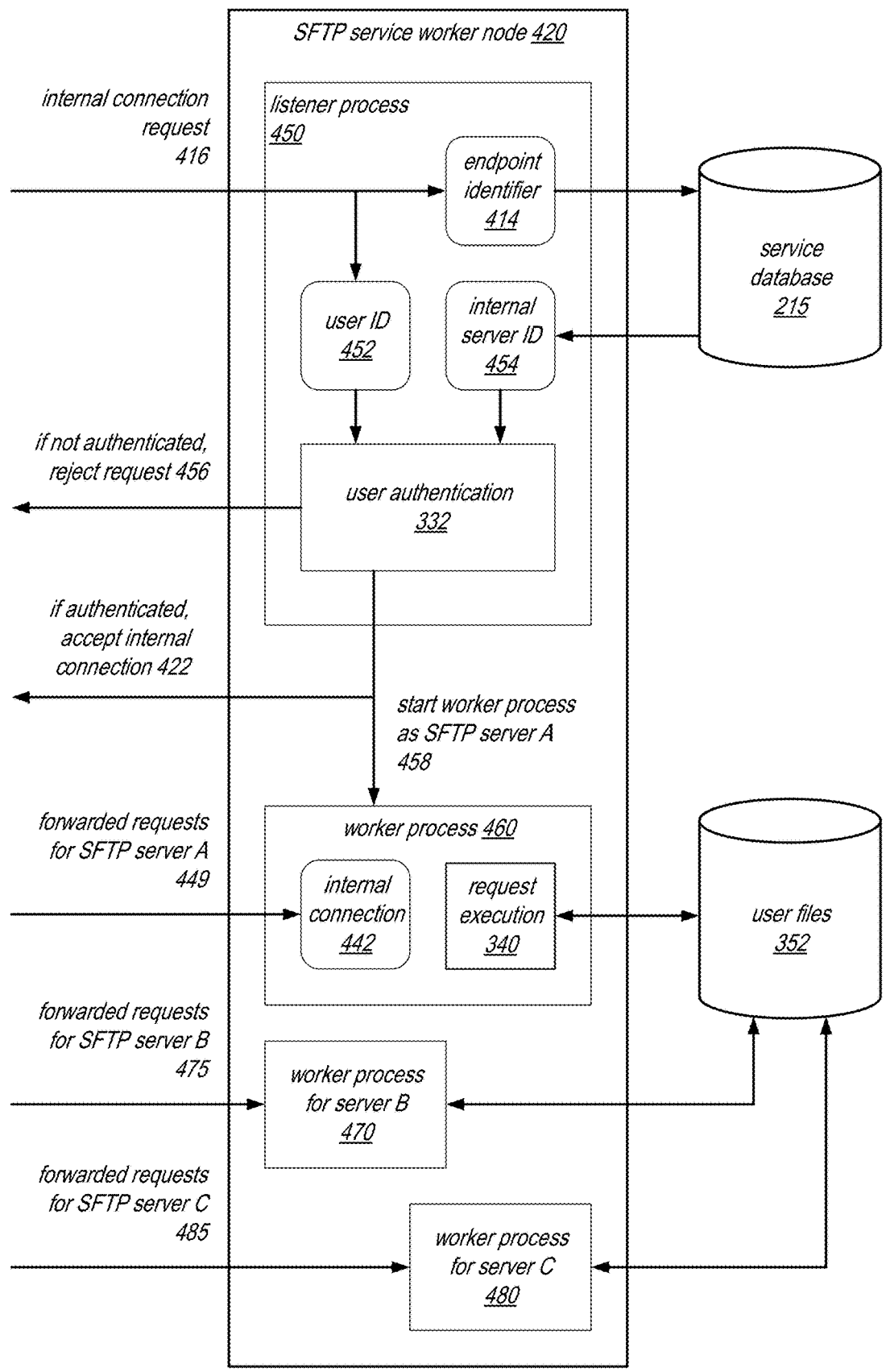
FIG. 4B illustrates an example worker node used to implement an SFTP service on top of a MTSES, according to some embodiments.

FIG. 4B illustrates an example worker node used to implement an SFTP service on top of a MTSES, according to some embodiments. As shown, the figure depicts further details in the operations of an embodiment of the worker node 420.

As discussed in FIG. 4A, the worker node 420 was selected to receive the internal connection request 416, which is labeled with server A's endpoint ID 414. As shown, in some embodiments, the worker node 420 may implement a listener module or process 450, which may wait for such connection requests (e.g. at a known TCP port number). In some embodiments, once the listener receives an internal connection request, it may parse from the request (e.g. extract a metadata attribute in the initial SYN packet) to determine the endpoint ID 414. In some embodiments, it may also obtain the user ID 452 of the user that is associated with the request, as shown. In some embodiments, the listener process 450 may use the server A ID 414 to look up an internal server ID 454 for server A, which may be maintained by the service database 215. In some embodiments, the incoming endpoint ID 414 may simply be used as the internal server ID 454.

As shown, in some embodiments, both the user ID 452 and internal server ID 454 may be provided as input to the user authentication module 332, to authenticate the user on that server. As discussed in connection with FIG. 3, the user authentication module 332 may be implemented in a variety of ways. In some embodiments, the user authentication may be performed by obtaining the user's public key associated with the server. If the user is not authenticated, at operation 456, the internal connection request is rejected. If the user is authenticated, at operation 422, as discussed in FIG. 4A, the connection request is accepted. Additionally, at operation 458, the worker node may start a worker process as the SFTP server A to handle traffic on the accepted internal connection. In some embodiments, each different internal connection may be handled by a different worker process, thread, container instance, etc.

As shown, the newly created worker process 460 may be configured to handed further forwarded requests for SFTP server A received over the internal connection 442. The worker process 460 may then execute the received request for server A using the request execution module, as discussed in connection with FIG. 3. In some embodiments, as discussed, the requests may access a user files repository 352 to access data associated with the virtual server, as discussed in connection with FIG. 3.

As shown, in some embodiments, the worker node 420 may also host additional worker processes for other SFTP virtual servers (or other types of virtual servers). As shown, in this example, a worker process 470 is currently running for a server B, to handle requests 475 for server B, and worker process 480 is currently running for server C, to handle requests 485 for server C. Accordingly, in some embodiments, the worker node 420 may implement a multitenant environment where it can be hosting or emulating multiple different virtual servers at any given time. In some embodiments, multiple worker nodes may be used to emulate a single virtual server. In some embodiments, individual worker nodes may be selected to receive connection requests for different virtual servers based on their load level, or based on the number of open connections that they are currently handling.

Figure 5A:
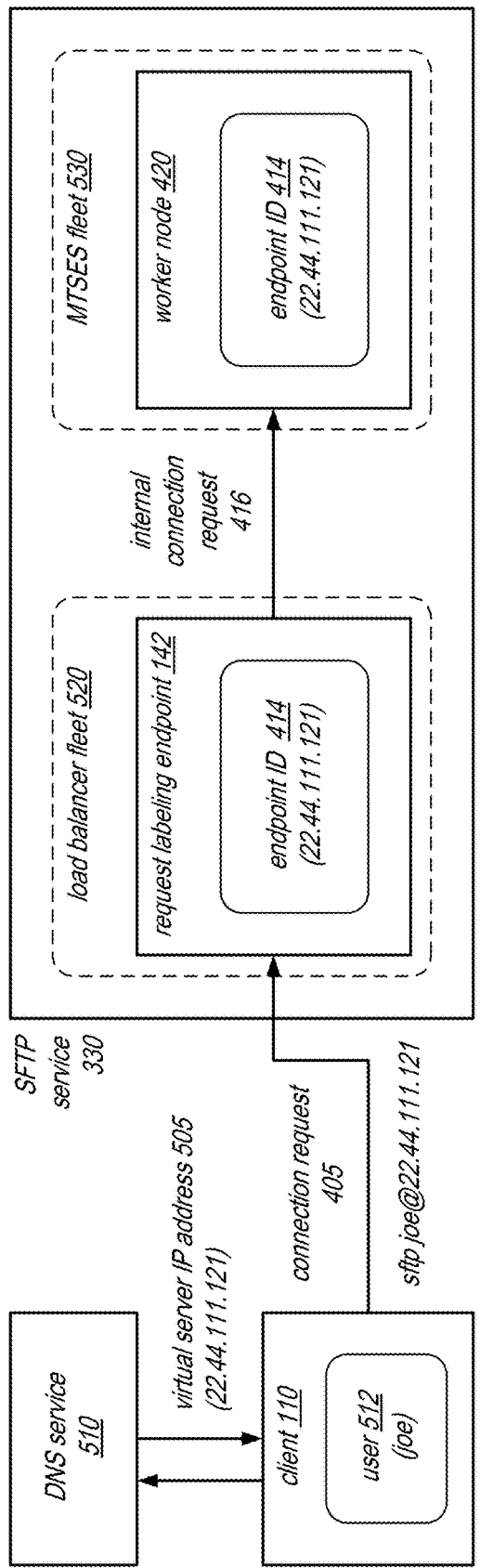
FIGS. 5A and 5B illustrate different implementations of request labeling endpoints that can be used to implement a service on top of a MTSES, according to some embodiments.
Figure 5B:
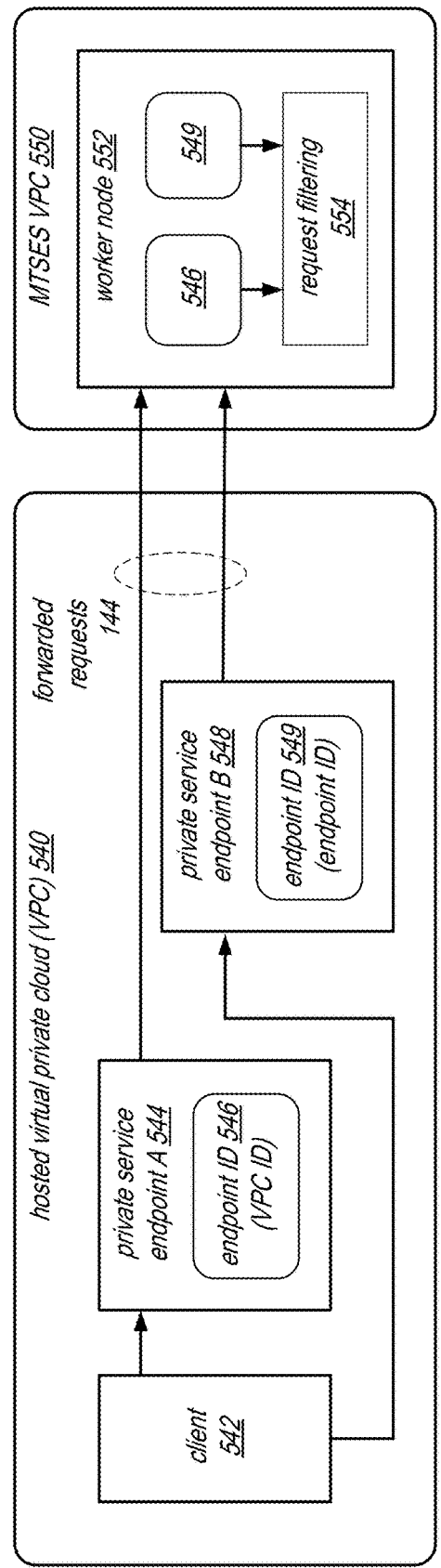

FIGS. 5A and 5B illustrate different implementations of request labeling endpoints that can be used to implement a service on top of a MTSES, according to some embodiments.

As shown, FIG. 5A depicts an embodiment of the client 110 and an embodiment of the SFTP service 330, as discussed previously. As shown, in this example, the client 110 may first obtain, from a DNS service 510, an IP address 505 for the virtual server hosted in the SFTP service 330, in this case, 22.44.111.121. In some embodiments, the client 110 may refer to the virtual server using an assigned DNS name, which may be used to look up the virtual server's IP address. In some embodiments, the IP address may be provided by the SFTP service 330 when the virtual server is first created. In some embodiments, the IP address may be specified by the client when creating the virtual server.

At operation 405, a connection request is provided to the SFTP service 330, at the destination IP address 22.44.111.121. As shown, the connection request 405 may specify a user associated with the virtual server (here joe). As shown, the connection request 405 may be directed to a particular request labeling endpoint 142 in the SFTP service 330. In this example, the request labeling endpoint 142 may be implemented as a network load balancer (NLB) node that is part of a load balancer fleet 520 maintained by or for the SFTP service 330. In some embodiments, the NLB node may also perform certain load balancing functions, for example to balance out request or connection loads across a number of different endpoints exposed by the MTSES.

In some embodiments, whenever a virtual server is created in the SFTP service 330, an NLB node is create for or assigned to the virtual server, in the load balancer fleet 520. In some embodiments, a single NLB node may be dedicated to a single virtual server. In some embodiments, a single NLB node may be used to label requests for multiple virtual servers. As shown, in this example, the request labeling endpoint 142 uses the IP address 505 of the virtual server as the endpoint ID. In some embodiments, this IP address may be simply obtained from the destination IP address on the incoming connection request 405. The request labeling endpoint 142 may then use this IP address to label requests for the virtual server, as discussed previously.

As shown, in this example, the labeling may occur using an internal connection request 416, as discussed in connection with FIGS. 4A and 4B. As a result, the endpoint ID (IP address 505) is conveyed to a selected worker node 420 in a MTSES pool or fleet 530, as discussed in connection with FIGS. 4A and 4B. Accordingly, the worker node 420 can use the endpoint ID to properly assume the identity of the SFTP server targeted by the connection request 405.

As shown, FIG. 5B depicts a client 542 that uses two private service endpoints A 544 and B 548 in a hosted virtual private cloud (VPC) 540 as the request labeling endpoint for the virtual server in the MTSES.

In some embodiments, the VPC 540 may be a network of compute nodes (e.g. VM instances) hosted on a servicer provider network on behalf of a particular client or customer. In some embodiments, the client or customer may specify the types (e.g. machine images) of the nodes in the VPC, the network addresses (e.g. IP addresses) of then nodes, and also the network topology of the VPC, among a variety of other aspects of the hosted network. In some embodiments, all nodes in the VPC may use an IP address that belong to a range of addresses provided by the service provider network or specified by the client. In some embodiments, VPC 540 may implement a privately hosted network for a client, which may be configured to recognize and connect to the client's on-premises network, which may be located remotely from the service provider network's hosting data center. In some embodiments, this connection may occur over a public and untrusted network, such as the Internet.

As shown, in this example, the client 542 is a node within the VPC 540, for example, a hosted compute node in the VPC. In some embodiments, the client may be outside of the VPC, for example, a physical computer in the on-premises network of the client that is connected to the hosted VPC 540. Advantageously, in this configuration, customers may access this virtual server endpoint from their remote premise, but the virtual server endpoint itself is maintained in the cloud, away from attackers on the Internet such as password scanner bots.

In some embodiments, as shown, a single VPC 540 may implement multiple private service endpoints (e.g. endpoint A 544 and endpoint B 548), which may both be used to label and forward requests 144 to the MTSES. In some embodiments, these different endpoints 544 and 548 may be used to represent different virtual servers. In some embodiments, these different endpoints 544 and 548 may be used for different users, or different types of server requests. In some embodiments, as shown, a private service endpoint (e.g. endpoint A 544) may use an identifier of the VPC as the endpoint ID 546 to label requests. Accordingly, all requests forwarded by this endpoint 544 will be labeled with the identifier of the VPC, indicating the originating VPC to the MTSES. In some embodiments, as shown, the private service endpoint (e.g. endpoint B 548 may use an endpoint identifier associated with that endpoint as the endpoint ID 549. Accordingly, all requests forwarded by this endpoint 548 will be labeled with the ID of that specific endpoint 548.

In some embodiments, as shown, forwarded the requests 144 may be sent to another VPC 550 that implements a fleet (e.g. a regional fleet) for the MTSES. In some embodiments, the worker nodes 552 in the fleet may extract the endpoint ID from the labeled requests 144, as shown. In some embodiments, these endpoint IDs may be used to filter requests, for example using a request filtering module or mechanisms 554. In some embodiments, this filtering may be used as a security mechanism within the MTSES, for example, to ensure that only certain VPCs or VCP endpoints can access the virtual server hosted in the MTSES. In some embodiments, the filtering may be implemented with the private server endpoint itself. In some embodiments, the filtering may be based on the client ID or source network address associated with the request. In this manner, the private server endpoint 544 or 548 or the filtering mechanism 554 may be used to implement a whitelist of allowed clients for a virtual server. In some embodiments, the endpoint IDs 546 and 549 may only be loosely tied to the virtual server. For example, in some embodiments, the endpoints 544 or 548 may be reassigned to act as the request labeling endpoint for another virtual server in the MTSES. Accordingly, these endpoint IDs 546 and 549 are not necessarily strongly tied to the actual internal server ID used within the MTSES.

In some embodiments, to support multiple private server endpoints in a single VPC, multiple DNS names may be assigned to the different private server endpoints. In this manner, clients in the VPC (or have access to the VPC) can access the virtual server via multiple different DNS names. In some embodiments, the VPC itself may implement a private DNS server, so that clients with access to the VPC can obtain the IP address of private server endpoints using recognized DNS names assigned to the endpoint. For example, in some embodiments, the DNS service 510 in FIG. 5A may be implemented as a node within the VPC 540.

Figure 6:
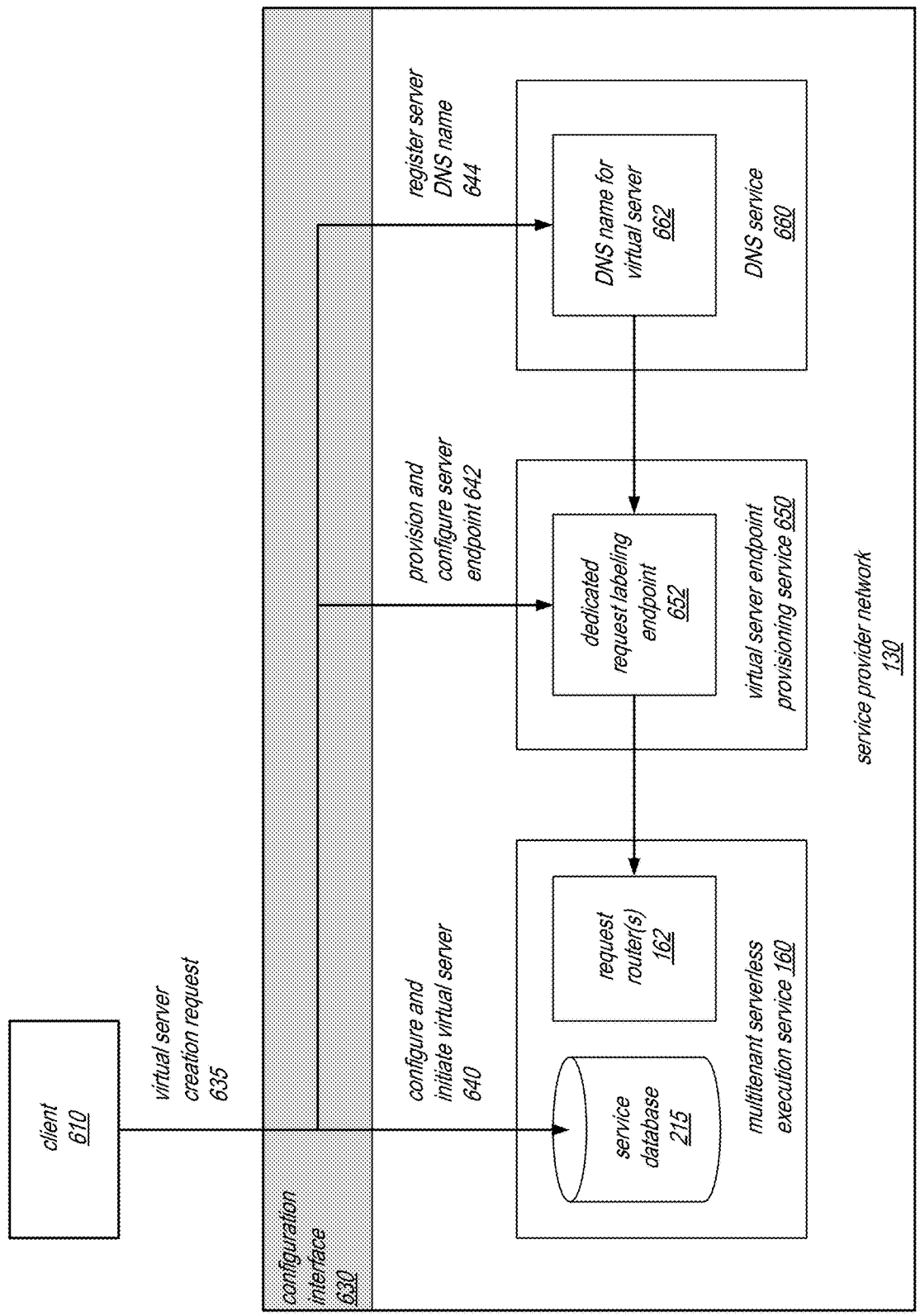
FIG. 6 illustrates an example process of creating a virtual server in a service provider network using a request labeling endpoint and a MTSES, according to some embodiments.

FIG. 6 illustrates an example process of creating a virtual server in a service provider network using a request labeling endpoint and a MTSES, according to some embodiments. As shown, in the figure, a client 610 is submitting a virtual server creation request 635 to the service provider network 130, via a configuration interface 630.

In some embodiments, the client 610 may be the client 110 of FIG. 1. In some embodiments, the configuration interface 630 may be an interface provided by a virtual server hosting or management service running within the service provider networks, such as for example the SFTP service 330 of FIG. 3. In some embodiments, the configuration interface 630 may be a user interface, such as a graphical user interface (GUI) or a command line interface. In some embodiments, the configuration interface 630 may be a programmatic interface, such as a web services interface or application programming interface (API).

As shown, the virtual server creation request 630 may specify a number of parameters for the virtual server (e.g. SFTP server) to be created, including for example, the server's DNS name, the server's desired IP address, etc. As shown, in some embodiments, a series of actions may then be performed within the service provider network 130 (e.g. by the SFTP service 330), to create the virtual server according to the client request 635.

As shown, in some embodiments, a server DNS name may be registered 644 for the virtual server. In some embodiments, the DNS name may be specified by the request 635. In some embodiments, the service provider may implement a DNS service, which may be used to store server names and their respective IP addresses within the service provider network. As shown, as a result of this registration, the DNS name 662 will be registered with the DNS service 660 in the service provider network, so that the DNS service 660 will be able to respond to queries for the DNS name 662 with the virtual server's IP address.

As shown, in some embodiments, a server endpoint is configured and/or provisioned. In some embodiments, this server endpoint may be the request labeling endpoint 142 of FIG. 1. In some embodiments, as shown, the server endpoint may be a dedicated server endpoint 652, which only labels and forwards requests for the new virtual server. In some embodiments, the server endpoint may be a newly provisioned resource (e.g. a virtual machine), which may be performed within a virtual server endpoint provisioning service 650. In some embodiments, a pool or fleet of such endpoints may be maintained within the service provider network, and one node from the pool or fleet may be selected to act as the server endpoint for the new virtual server. In some embodiments, the server endpoint 652 may be implemented within or on top of another type of node that may serve another function, such as for example a network load balancer node or a request router node, etc.

As shown, in some embodiments, the new virtual server may be configured and/or initiated in the MTSES 160. In some embodiments, this configuration or initiation may involve adding metadata about the virtual server to the service database 215. In some embodiments, some of the metadata may be provided to request routers 162 to make the request routers aware of the new virtual server. In some embodiments, an entry may be added to a lookup table in the service database 215, to associate an endpoint ID for the new virtual server with an internal server ID of the new virtual server. In some embodiments, some small number of worker nodes may be initialized for the virtual server. Depending on the type of virtual server, other preparation actions may be performed. In some embodiments, new data storage may be set aside to act as the virtual server's local data storage. In some embodiments, access roles or credentials may be created to control access to the new virtual server. In some embodiments, after all these preparation actions are performed, the service provider network 130 will be ready to handle requests for the virtual server.

FIG. 7 is a flow diagram illustrating a process of handling a request by a virtual server implemented using a request labeling endpoint and a MTSES, according to some embodiments. In some embodiments, the depicted process may be performed by the service provider network 130 of FIG. 1, or the SFTP service 330 of FIG. 3.

As shown, in some embodiments, operations 720, 730, and 740 may be a series of operations 710 performed by a request labeling endpoint for a virtual server implemented using a MTSES. In some embodiments, the request labeling endpoint may be the request labeling endpoint 142 of FIG. 1 and the virtual server may be the virtual server 140 of FIG. 1.

At operation 720, a request direct to a virtual server is received at the request labeling endpoint. In some embodiments, the virtual server may implement a SFTP server, and the request may specify the virtual server in a destination IP address of the request. In some embodiments, the request labeling endpoint may be specifically created or assigned to label and forward requests directed to the virtual server.

At operation 730, the request labeling endpoint labels the request with an endpoint or server ID for the virtual server. In some embodiments, the virtual server may be hosted in a MTSES that cannot provide the identity of the virtual server to its worker nodes. Accordingly, in some embodiments, the request labeling endpoint is used to label requests forwarded to the MTSES to allow the worker nodes of the MTSES to determine the virtual server that is targeted by the request. In some embodiments, this labeling occur during the connection establishment process for a TCP connection. Accordingly, all requests that are submitted over that connection will be identified as belonging to the virtual server. In some embodiments, the labeling may occur for each network message or datagram individually. In this manner, the MTSES can be free to assign each message or datagram to different worker nodes.

At operation 740, the request is forwarded by the request labeling node to the MTSES. In some embodiments, the MTSES may expose one or more endpoints for the service, and the request labeling node may simply choose a MTSES endpoint to forward the labeled request.

As shown, in some embodiments, operations 760, 770, and 780 may be a series of operations 750 performed by a request labeling endpoint for a virtual server implemented using a MTSES. In some embodiments, the MTSES may be the MTSES 160 of FIG. 1. The MTSES may be a multi-tenant service configured to host many different virtual servers of different clients, including the virtual server of operation 710.

At operation 760, requests are received at the MTSES that are directed to different virtual servers hosted by the MTSES, including the virtual server of operations 710. As discussed, in some embodiments, the MTSES may dynamically select or provision worker nodes to handle received requests. However, the MTSES may be designed or configured so that it cannot provide the identity of the virtual server to the worker nodes. Without this endpoint identity, the worker nodes are not able to determine which server they are being asked to assume for the requests. However, with the request labeling endpoint outside of the MTSES, requests may be labeled with the virtual server's ID, so the worker nodes can determine the virtual server that they are to assume.

At operation 770, the MTSES dynamically selects nodes from a pool of nodes to execute the individual requests. In some embodiments, this selection may be performed in a manner so as to load balance the load among the worker nodes. In some embodiments, the selection may be done on a per-connection basis. In some embodiments, the load balancing may be done to balance out the number of connections that are handled by each worker node, as one balancing factor.

At operation 780, during execution of an individual request at a selected node, the node determines the endpoint ID of the virtual server from the label request. Thus, in this manner, the worker node is able to use the labeled request to determine the endpoint ID of the virtual server. In some embodiments, the request may be a connection (e.g. TCP connection) request, and the endpoint ID may be specified as a metadata attribute in the request packet. In some embodiments, the endpoint ID may be specified as an initial message or packet in a connection. In some embodiments, a connection request may be accepted or denied based on the endpoint ID in the labeled request.

FIG. 8 is a flow diagram illustrating a process of performing a request to create a virtual server using a request labeling endpoint and a MTSES, according to some embodiments. In some embodiments, the depicted process in the figure may be performed by the service provider network 130 of FIGS. 1 and 6, or the SFTP service 330 of FIG. 3.

At operation 810, a client request is received to create a virtual server using a multitenant serverless execution service (MTSES), where the MTSES dynamically selects nodes to execution requests for different virtual servers but does not provide identity information of respective target virtual servers of the requests to nodes selected to execute the requests. In some embodiments, the MTSES may be MTSES 160 of FIG. 1. In some embodiments, the creation request may be received via a configuration interface, such as configuration interface 630 of FIG. 6.

As shown, operations 820 represents a number of operations 830, 840, and 850 that may be performed to carry out the virtual server creation request. As shown, the operations 830, 840, and 850 may be performed in any order, depending on the embodiment.

At operation 830, a request labeling endpoint is provisioned or configured for the virtual server to be created. In some embodiments, the request labeling endpoint may be the endpoint 142 of FIG. 1. In some embodiments, the request labeling endpoint is implemented outside the MTSES, and configured to label requests directed to the virtual server with an endpoint or server ID associated with the virtual server. The request labeling endpoint may then forward the labeled requests to the MTSES. In some embodiments, the request labeling endpoint may be provisioned or assigned specially to that one virtual server. In some embodiments, the request labeling endpoint may be a virtual machine instance. In some embodiments, the request labeling endpoint may be configured to perform one or more other functions such as load balancing, request filtering, request transformation, network address translation, etc.

At operation 840, the virtual server is initiated and/or configured in the MTSES. In some embodiments, the initiation and/or configuration may cause the MTSES to begin hosting the virtual server, so that when requests are received at the MTSES for the virtual server, individual nodes will be selected to execute the requests for the virtual server. In some embodiments, when executing the requests, the selected nodes may use the labeled request to determine the endpoint ID of the virtual server. In some embodiments, the initiation or configuration may involve registering the new virtual server in a service database, and storing metadata about the virtual server in the service database. In some embodiments, the endpoint ID to be used by the request labeling node to label requests for the new virtual server may be added to a lookup table in the service database, so that worker nodes can use the lookup table to determine an internal server ID used by the MTSES. In some embodiments, other service-specific processes may be started for the virtual server, for example, to monitor the status, metrics, or statistics about the virtual server.

At operation 850, a DNS name is assigned to the virtual server, in accordance with the client request. In some embodiments, the configuration interface may optionally allow clients to specify a DNS server name for the virtual server to be created. In some embodiments, the service provider network may provide its own DNS service, or help the client configure another DNS service. In some embodiments, the virtual server may also be associated with an IP address that may be selected by the service provider network or specified by the client request. Accordingly, the DNS name will be associated with the virtual server's IP address at the DNS service.

Figure 9:
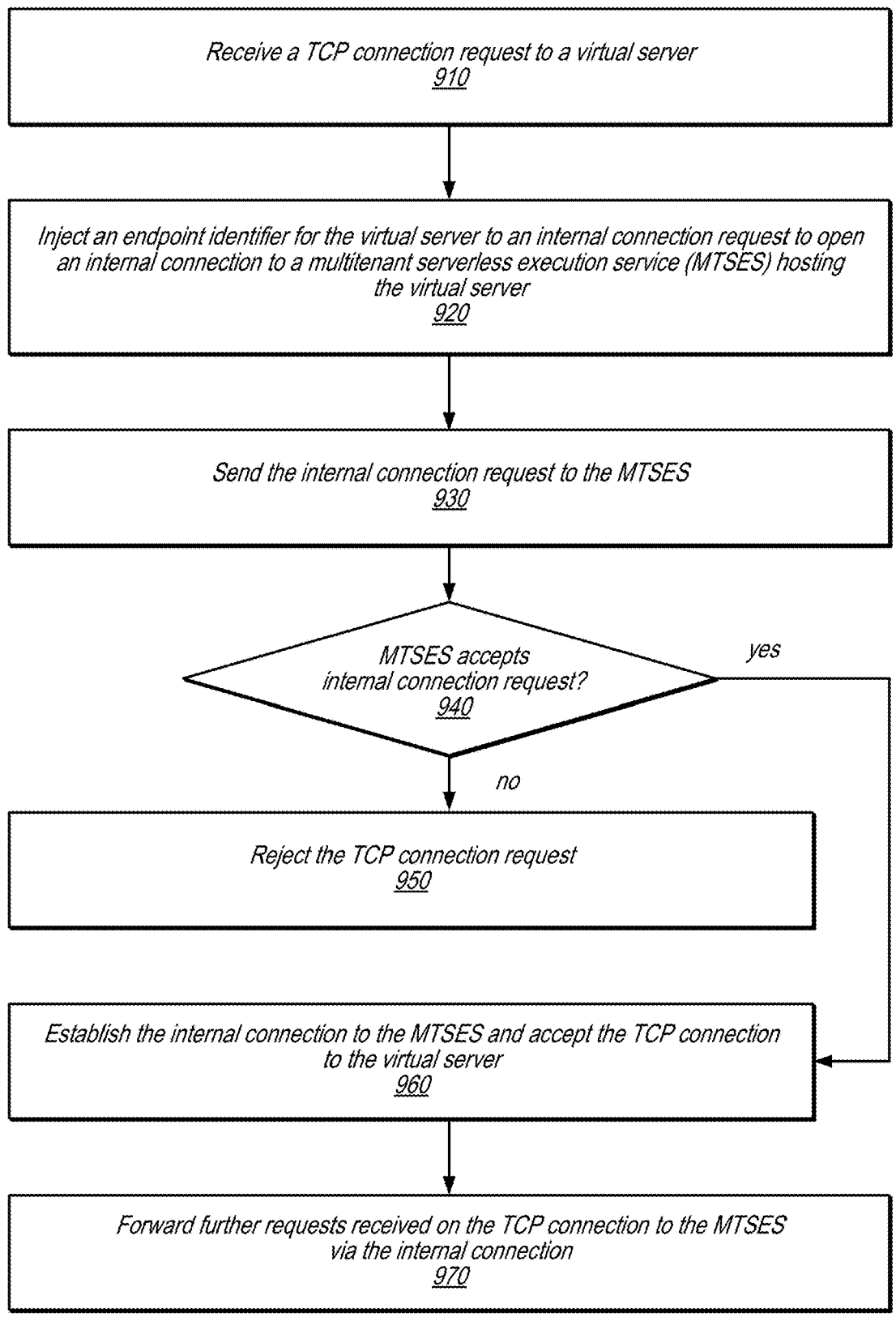
FIG. 9 is a flow diagram illustrating a process of handling a connection request by a request labeling endpoint of a virtual server, according to some embodiments.

FIG. 9 is a flow diagram illustrating a process of handling a connection request by a request labeling endpoint of a virtual server, according to some embodiments. In some embodiments, the depicted process may be performed by, for example, the request labeling endpoint 142, as discussed in connection with FIGS. 1, 4A, and 4B.

At operation 910, a TCP connection request is received to a virtual server, at the request labeling endpoint. In some embodiments, as discussed, the labeling may occur for individual client connections to the virtual server, for example, individual TCP connections. In some embodiments, the virtual server may be a SFTP server hosted in an MTSES, and the request labeling endpoint may be implemented outside of the MTSES.

At operation 920, an endpoint or server identifier for the virtual server is injected to an internal connection request to open an internal connection to the MTSES hosting the virtual server. In some embodiments, the endpoint ID may be an identifier or indicator (e.g. an IP address, VPC ID, or VPC endpoint ID) that can be used by the worker nodes of the MTSES to determine the identity of the virtual server. In some embodiments, the injection may be made by adding a metadata attribute to an initial TCP SYN packet that is sent to the MTSES to open a TCP connection to a worker node (or some request router) within the MTSES. In some embodiments, the injection may be made using other messages in a connection establishment handshake procedure. In some embodiments, the endpoint ID may be injected as a distinct message (e.g. an initial packet) within the connection, or in a datagram of a connectionless protocol. At operation 930, the internal connection request with the injected endpoint ID of the virtual server is sent to the MTSES.

At operation 940, a determination is made whether the MTSES accepts the internal connection request. In some embodiments, the MTSES's decision to accept or reject a connection request may be made based in part on the endpoint ID. For example, in some embodiments, if an endpoint ID is not recognized as a valid virtual server in the MTSES, the connection request will be rejected. As another example, if a specified user cannot be authenticated for a specified endpoint ID, the connection request will be rejected. As yet another example, if the connection request specifies an action that is not permitted on a specified virtual server, the connection request may be rejected. If the internal connection request is rejected, the process proceeds to operation 950, where the TCP connection request from the client is also rejected. However, if the internal connection request to the MTSES is accepted, the process proceeds to operation 960.

At operation 960, the request labeling endpoint establishes the internal connection to the MTSES, and accepts the TCP connection from the client to the virtual server. In some embodiments, these two connections may correspond to the internal connection 442 and external connection 444 shown in FIG. 4A. In some embodiments, the request labeling endpoint may maintain these connections as an intermediate node between the client and the virtual server. In some embodiments, the request labeling nodes may be configured to maintain multiple client connections to the virtual server (e.g. for different users). In some embodiments, a single request labeling endpoint may be a multitenant node that maintains client connections for multiple different virtual servers.

At operation 970, further requests received via the TCP connection from the client are forwarded to the MTSES via the internal connection. In some embodiments, the request labeling endpoint may also forward responses from the virtual server back to the client, in the reverse direction. In some embodiments, the request labeling endpoint may rewrite output packets to the client to make it appear that the response came from the virtual server (e.g. by modifying response packets to indicate the virtual server's IP address as the source address). In some embodiments, the request labeling endpoint may perform other transformations on the ingress on egress traffic on the connections as they pass through the endpoint.

Figure 10:
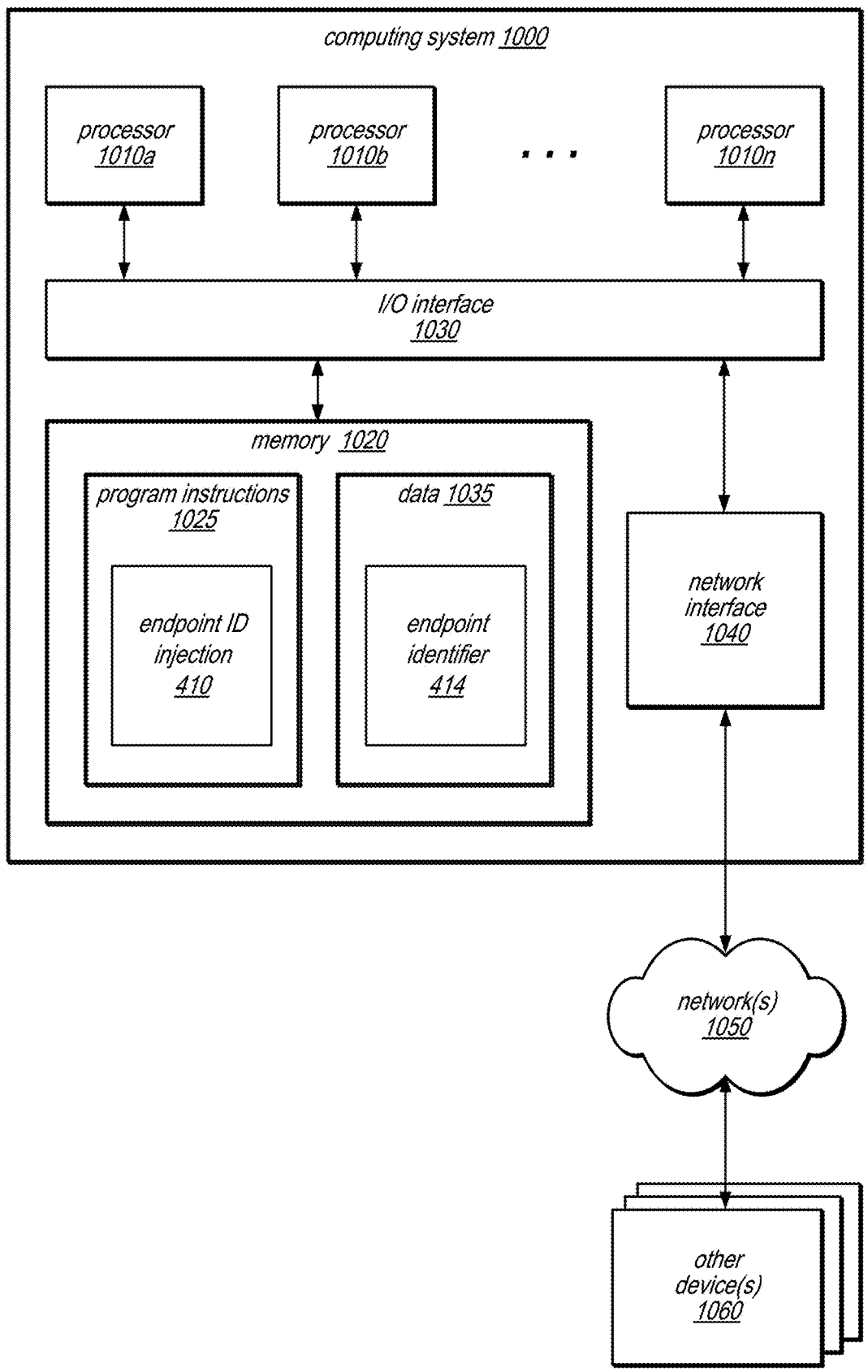
FIG. 10 is a block diagram illustrating an example computer system that can be used to implement a virtual server using a request labeling endpoint and a MTSES, according to some embodiments.

FIG. 10 is a block diagram illustrating an example computer system that can be used to implement a virtual server using a request labeling endpoint and a MTSES, according to some embodiments.

Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. In some embodiments, the code memory section 1025 may store program instructions, such as for example program instructions to execute the endpoint ID injection component 410 of the request labeling endpoint. In some embodiments, the data memory 1035 may be used to store data used by the program instructions, for example, the endpoint identifier 414 for the virtual server.

As shown, in some embodiments, the program instructions 1025 may store one or more in-memory modules that implement the virtual cryptographic device 156, as discussed in connection with FIG. 1. As discussed, in some embodiments, the virtual cryptographic device 156 may be implemented by the VMM, and may be a purely virtual device. In some embodiments, the virtual cryptographic device 156 may be backed by an actual physical device, such as a storage device or network interface card, and augment the functions of those devices by performing one or more cryptographic operations. As discussed, in some embodiments, the actual execution of the cryptographic operation may be performed in a memory other than memory 1020 of the physical host executing the VMM. For example, the actual execution of the cryptographic operation may occur on another hardware device, such as a cryptographic coprocessor or a specialized device such as a network interface card specially adapted to perform the cryptographic operation.

As shown, in some embodiments, the data 1035 may store the cryptographic key store 152, as discussed in connection with FIG. 1. As discussed, the key store 152 may be maintained in a portion of the system memory that is accessible to the VMM, but is not accessible to the guest VMs. In some embodiments, the VMM itself may be another process running on the host OS, and may be allocated memory pages by the host OS. The VMM may reserve some portion of its allocated memory for its own use, and never allocate that portion to any of the guest VMs. Accordingly, the cryptographic key store 152 may be implemented in that portion of the VMM's memory space that is inaccessible to the guest VMs. Advantageously, the key store 152 is implemented using the main memory of the virtualization host, and not using other hardware security devices such as specialized CPUs, HSMs, TPMs, and the like. As discussed, such specialized hardware devices are not readily scalable and adaptable for virtualization environments that host large numbers of virtual machines for different clients.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more computers comprising one or more processors and associated memory that implement a virtual server, comprising:
   a multitenant serverless execution service (MTSES) configured to:
   receive a plurality of requests directed to a plurality of different virtual servers hosted in the MTSES; and
   dynamically select nodes from a plurality of nodes to forward individual ones of the plurality of requests, wherein the MTSES does not provide identity information of respective target virtual servers of the requests to the nodes selected to execute the requests; and
   a request labeling endpoint for the virtual server, implemented outside the MTSES, and configured to:
   receive one or more requests directed to the virtual server;
   label the one or more request with an endpoint identifier associated with the virtual server, wherein the endpoint identifier is used by one or more nodes of the MTSES to assume the virtual server during execution of the one or more requests; and forward the one or more requests to the MTSES.

2. The system of claim 1, wherein:

the virtual server is a Secure Shell File Transfer Protocol (SFTP) server; and to execute a SFTP connection request from a user, the MTSES causes a selected node to authenticate the user for the SFTP server, using the endpoint identifier.

3. The system of claim 1, wherein:

the request labeling endpoint is a network load balancer (NLB) configured to forward requests to the MTSES; and the NLB is configured to send an Internet Protocol (IP) address of the virtual server as the endpoint identifier of the virtual server.

4. The system of claim 1, wherein:

the request labeling endpoint is a private service endpoint implemented in a virtual private cloud (VPC) network hosted in a service provider network; and the private service endpoint is configured to send an endpoint identifier of the private service endpoint as the endpoint identifier of the virtual server to the MTSES.

5. The system of claim 1, wherein the request labeling endpoint is configured to:

establish a Transmission Control Protocol (TCP) connection to the MTSES to forward the one or more requests; and send the endpoint identifier to the MTSES in an initial packet on the TCP connection.

6. A computer-implemented method, comprising:

performing, by one or more computers comprising one or more processors and associated memory that implement a multitenant serverless execution service (MTSES):

receiving a plurality of requests directed to a plurality of different virtual servers hosted in the MTSES; and dynamically selecting nodes from a plurality of nodes to forward individual ones of the plurality of requests, wherein the MTSES does not provide identity information of respective target virtual servers of the request to the nodes selected to execute the requests; and performing, by one or more computers comprising one or more processors and associated memory that implement a request labeling endpoint for a virtual server hosted in the MTSES:

receiving one or more requests directed to the virtual server;

labeling the one or more requests with an endpoint identifier associated with the virtual server, wherein the endpoint identifier is used by one or more nodes of the MTSES to assume the virtual server during execution of the one or more requests; and forwarding the one or more requests to the MTSES.

7. The method of claim 6, wherein:

the virtual server is a Secure Shell File Transfer Protocol (SFTP) server; and executing a SFTP connection request includes authenticating a user associated with the SFTP request for the SFTP server, wherein the authentication is performed using the endpoint identifier.

8. The method of claim 6, further comprising:

creating the virtual server in a service provider network, wherein the creation includes:

configuring a network load balancer (NLB) to serve as the request labeling endpoint; and configuring the NLB to send a network address assigned to the virtual server as the endpoint identifier of the virtual server.

9. The method of claim 6, said creating the virtual server comprises:

creating the virtual server in a service provider network, wherein the creation includes:

configuring a private service endpoint in a virtual private cloud (VPC) network hosted in the service provider network as the request labeling endpoint; and configuring the private service endpoint to send a VPC identifier of the VPC network as the endpoint identifier to the MTSES.

10. The method of claim 9, wherein:

executing a request to the virtual server at a selected node of the MTSES includes verifying that the request is labeled with the VPC identifier, wherein requests to the virtual server not labeled with the VPC identifier are rejected by the MTSES.

11. The method of claim 6, further comprising performing, by the request labeling endpoint:

sending a connection request to establish a Transmission Control Protocol (TCP) connection to the MTSES to forward the one or more request; and sending the endpoint identifier to the MTSES in an initial packet on the TCP connection.

12. The method of claim 11, wherein said dynamically selecting a node to execute a request to the virtual server comprises, performing, by the MTSES:

selecting a node to accept the TCP connection request based at least in part on a number of TCP connections maintained by the node.

13. The method of claim 11, further comprising performing, by the MTSES:

accepting the connection request for the TCP connection at one node of the plurality of nodes; and accepting, at that one node, another TCP connection for a different virtual server hosted by the MTSES.

14. The method of claim 11, wherein said dynamically selecting nodes to forward individual ones of a plurality of requests comprises, performing, by the MTSES:

selecting different nodes to maintain different connections for an individual virtual server.

15. The method of claim 6, wherein the request labeling endpoint is dedicated to the virtual server and does not forward requests to the MTSES for any other virtual server hosted in the MTSES.

16. One or more non-transitory computer-accessible storage media storing program instructions that when executed on or across one or more processors of a service provider network cause the service provider network to:

receive a client request to create a virtual server using a multitenant serverless execution service (MTSES), wherein the MTSES dynamically selects nodes from a plurality of nodes to forward requests for different virtual servers but does not provide identity information of respective target virtual servers of the requests to the nodes selected to execute the requests; and cause the virtual server to be created according to the client request, to:

cause a request labeling endpoint to be configured outside the MTSES to label one or more requests directed to the virtual server with an endpoint identifier of the virtual server and forward the one or more request to the MTSES; and cause the virtual server to be initiated in the MTSES, so that one or more nodes selected to execute the one or more requests are configured to use the endpoint identifier to assume the virtual server during execution of the one or more requests.

17. The one or more non-transitory computer-accessible storage media of claim 16, wherein to cause the virtual server to be created according to the client request, the program instructions when executed on or across the one or more processors cause the service provider network to create a Secure Shell File Transfer Protocol (SFTP) server.

18. The one or more non-transitory computer-accessible storage media of claim 16, wherein to cause the virtual server to be created, the program instructions when executed on or across the one or more processors cause the service provider network to:

cause a network load balancer (NLB) to be configured to serve as the request labeling endpoint; and cause the NLB to be configured to send a network address assigned to the virtual server as the endpoint identifier of the virtual server.

19. The one or more non-transitory computer-accessible storage media of claim 16, wherein, to cause the virtual server to be created, the program instructions when executed on or across the one or more processors cause the service provider network to:

cause a private service endpoint to be configured in a virtual private cloud (VPC) network of a client hosted in the service provider network as the request labeling endpoint; and cause the private service endpoint to be configured to send an endpoint identifier of the private service endpoint as the endpoint identifier to the MTSES.

20. The one or more non-transitory computer-accessible storage media of claim 16, wherein, to cause the virtual server to be created, the program instructions when executed on or across the one or more processors cause the service provider network to:

cause a Domain Name System (DNS) name to be assigned to the virtual server in accordance with the client request.

* * * * *